No. 728,886. PATENTED MAY 26, 1903.
L. ECKER.
DEVICE FOR BENDING AND SHAPING GROWING TREES.
APPLICATION FILED FEB. 14, 1902.
NO MODEL.
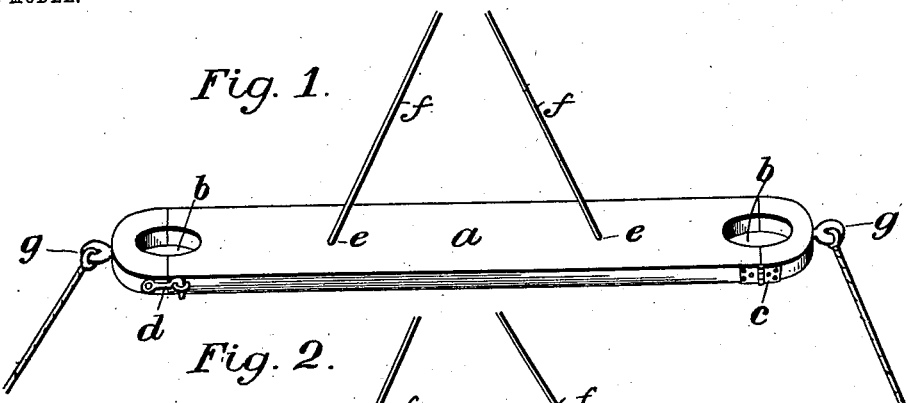
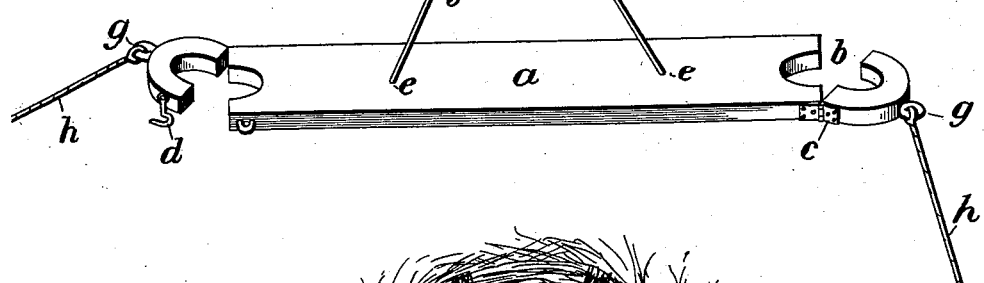
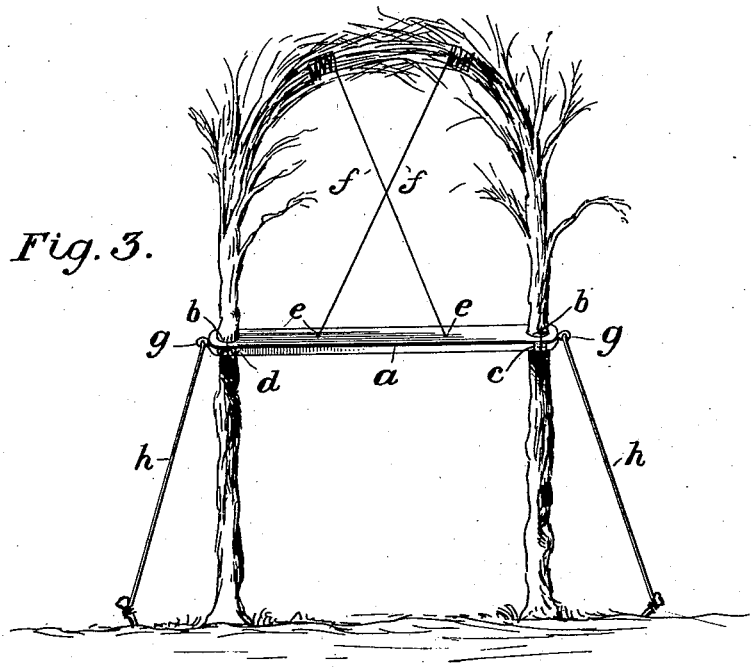
Lorenzo Ecker
Inventor
Witnesses
Chas. E. Riordan
Edw. S. Duvall, Jr.
by A. J. Gardner
Attorney No. 728,886. Patented May 26, 1903.

UNITED STATES PATENT OFFICE.

LORENZO ECKER, OF BROADALBIN, NEW YORK.

DEVICE FOR BENDING AND SHAPING GROWING TREES.

SPECIFICATION forming part of Letters Patent No. 728,886, dated May 26, 1903.

Application filed February 14, 1902. Serial No. 94,138. (No model.)

*To all whom it may concern:*

Be it known that I, LORENZO ECKER, a citizen of the United States, residing at Broadalbin, in the county of Fulton and State of New York, have invented a certain new and useful Device for the Bending and Shaping of Growing Trees; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is a device for bending and shaping young trees while growing into an ornamental arbor. I attain the object intended by means of the mechanism illustrated in the accompanying drawings, in which—

Figure 1 shows the device closed. Fig. 2 shows the same opened, and Fig. 3 shows the same in use.

Similar letters refer to similar parts throughout the several views.

$a$ is a board of variable length and width, (to meet requirements,) in either end of which a circle $b$ is cut. The board is then cut through the center of the circles and the pieces thus formed reattached to the main board by means of copper hinges $c$ on the one side and provided with hooks and staples $d$ on the other to lock the same. Equidistant from the center of the board holes $e$ $e$ are bored, through which guy-ropes $f f$ are passed, intended to reach and be fastened to the tops of the trees, bent to desired shape. At each extremity of the board are screw eyes or staples $g$ $g$, to which are attached guy-ropes $g$ and $h$, leading to pegs driven in the ground at the sides of the trees, thus holding the trees rigid, straight, and in the proper shape until the grain is set.

What I claim as my invention, and desire to secure by Letters Patent, is—

1. In a device for bending and shaping growing trees the combination of a bar, a clasp at each end thereof, adapted to hold the trunk of a growing tree, means for staying said bar in a fixed position to the ground, and means for staying the top of said tree in a fixed position to said bar, substantially as and for the purpose set forth.

2. In a device for shaping and bending growing trees the combination of a bar, a clasp at each end thereof, adapted to hold the trunk of a growing tree, stays at each end of said bar adapted to be secured to the ground, and stays secured to the central portion of said bar, adapted to secure the tops of the growing trees in a fixed position.

In testimony whereof I affix my signature in presence of two witnesses.

LORENZO ECKER.

Witnesses:
EDWARD D. JAMES,
ARCHIBALD ROBERTSON.